United States Patent [19]

Kerr, III et al.

[11] Patent Number: 4,929,506

[45] Date of Patent: May 29, 1990

[54] COATED POLYCARBONATE ARTICLES

[75] Inventors: Stuart R. Kerr, III, Evansville; James E. Moore, Mt. Vernon, both of Ind.

[73] Assignee: General Electric Company, Pittsfield, Mass.

[21] Appl. No.: 140,084

[22] Filed: Dec. 31, 1987

[51] Int. Cl.$^5$ .................... B32B 27/36; B29D 11/00
[52] U.S. Cl. .................... 428/412; 428/423.7; 428/424.2; 428/424.4; 428/447; 428/451; 428/520; 428/522; 427/164
[58] Field of Search ............ 428/412, 423.7, 424.2, 428/424.4, 447, 451, 520, 522

[56] References Cited

U.S. PATENT DOCUMENTS

| | | | |
|---|---|---|---|
| 4,107,391 | 3/1978 | Moore et al. | 428/483 |
| 4,198,465 | 3/1980 | Moore et al. | 428/409 |
| 4,218,508 | 8/1980 | Humphrey, Jr. | 428/331 |
| 4,507,198 | 3/1985 | Chu | 204/159 |
| 4,561,950 | 12/1985 | Leo | 522/91 |
| 4,598,009 | 7/1986 | Christie et al. | 428/172 |

*Primary Examiner*—P. C. Ives
*Attorney, Agent, or Firm*—Spencer D. Conard

[57] ABSTRACT

Coated polycarbonate articles, such as sheet and film, are coated with a hard, abrasion and chemical resistant coating which is the photoreaction product of an acrylated urethane oligomer, a difunctional acrylate monomer and preferably also a monofunctional olefinic monomer. These coated articles may be thermoformed or flexed without cracking or delamination of the protective coating. A specific embodiment of the invention is a coated flexible siloxane-polycarbonate block copolymer.

16 Claims, No Drawings

COATED POLYCARBONATE ARTICLES

BACKGROUND OF THE INVENTION

This invention relates to coated polycarbonate articles. More particularly, the invention relates to polycarbonate articles coated with abrasion and chemical resistant protective coatings, which are flexible and thermoformable.

Thermoplastics, such as polycarbonates, polyesters, polystyrene, polyvinyl, polymethacrylates and the like are commercially important materials, which are useful in a wide range of applications; from non-opaque, impact resistant sheets to shaped articles. Many of these materials have rather low resistance to scratching and abrasion and are susceptible to attack by common solvents and chemicals. In addition, these polymers often undergo degradation upon exposure to ultraviolet light.

These problems have largely been overcome by coating the thermoplastic materials with hard, abrasion and chemical resistant coatings. Such coatings may contain an ultraviolet light-absorbing compound to protect the thermoplastic against the deleterious effects of ultraviolet light. Typically, these coatings have been radiation-curable, acrylate-based coatings.

Previous attempts to produce hard, abrasion and chemical resistant coatings have generally employed highly functionalized acrylic monomers. The resulting cured coatings were highly crosslinked. Moore et al, in U.S. Pat. No. 4,198,465, describe a polycarbonate article coated with a durably adherent mar, abrasion and chemical resistant UV-cured coating. The coating is comprised of the photoreaction products of polyfunctional acrylate monomers and resorcinol monobenzoate.

Although crosslinked acrylic coatings are quite hard and resist scratching and abrasion, they are often rather brittle and are substantially thermoset. These properties can be disadvantageous if the coated thermoplastic is to be thermoformed or is to be employed in applications where flexing will be encountered. Attempts to flex or thermoform sheets or films coated with highly crosslinked coatings may result in rupture or separation of the coating, because the coating lacks the requisite elongation characteristics.

Various post-formable coating compositions have been proposed. For example, Moore et al., in U.S. Pat. No. 4,107,391, describe thermoformable coatings for thermoplastic substrates. These coatings are photopolymerizable wax-containing resins or blends which comprise solutions of either unsaturated polyesters or polymethylmethacrylate in styrene or methylmethacrylate.

A. F. Leo, in U.S. Pat. No. 4,561,950, discloses post-formable coatings for metallic substrates, which comprise a silicone dicarbinol diurethane diacrylate, isobornyl acrylate or methacrylate, acrylic acid or methacrylic acid and optionally an aliphatic polyester urethane diacrylate, wherein the polyester has a molecular weight in the range of 600 to 2000. These coatings are said to be radiation polymerizable and flexible in the cured state.

U.S. Pat. No. 4,507,198, Y. C. Chu, discloses UV-curable coating compositions for floor tiles and other applications. These coatings contain an acrylate-terminated urethane-polyester oligomer and a mono-functional acrylate diluent which is the reaction product of a hydroxyalkyl acrylate and an isocyanate.

A need continues to exist for abrasion and chemical resistant coated thermoplastic articles which are both thermoformable and flexible.

SUMMARY OF THE INVENTION

In accordance with the present invention, novel coated polycarbonate articles are coated with the photoreaction product of:
(a) a major proportion of an acrylated urethane oligomer, which has a molecular weight of from about 800 to about 50,000 and a degree of functionality of from 1 to about 4;
(b) a minor proportion of a difunctional acrylate monomer, wherein relative proportions of the acrylated urethane oligomer and the difunctional acrylate monomer are controlled to provide a flexible, thermoformable cured coating.

In one embodiment, the polycarbonate article is coated with the above coating which further comprises a monofunctional acrylate monomer in a proportion to decrease the crosslink density of the cured coating, and provide a flexible, thermoformable cured coating.

The coated polycarbonate articles may be elastomeric siloxane-polycarbonate block-copolymers. The coated articles of this invention have been found to have hard, abrasion and chemical resistant coatings which are flexible and thermoformable and which adhere strongly to the polycarbonate substrate.

DETAILED DESCRIPTION OF THE INVENTION

The polycarbonates employed as the substrates of the coated articles of this invention are well-known thermoplastics. Generally, any polycarbonate can be used to make the coated articles of the present invention. Such polycarbonates include, but are not limited to those described in U.S. Pat. Nos. 3,161,615; 3,220,973; 3,312,659; 3,312,660; 3,313,777, 3,666,614; 3,989,672, among others, all of which are incorporated herein by reference. Generally, such polycarbonate is an aromatic carbonate polymer having recurring units of the formula:

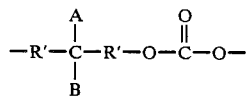

wherein each —R'— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

Also included herein are branched polycarbonates wherein a polyfunctional aromatic compound is reacted with the dihydric phenol and carbonate precursor to provide a thermoplastic randomly branched polycarbonate wherein the recurring units of the above formula contain branching groups.

Exemplary polycarbonate resins are those derived from the reaction of bisphenol-A and phosgene. These polycarbonates have from 10-400 recurring units of the formula:

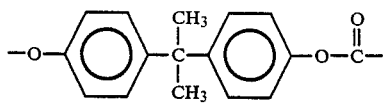

In one embodiment of this invention, the coated polycarbonate is a coated siloxane-polycarbonate block copolymer. Such copolymers are highly transparent elastomers which have potential utility as flexible glazing materials, e.g. as windows for automobile convertible tops. Uncoated siloxane-polycarbonate block copolymer films are susceptible to scratching and abrasion. The coated siloxane-polycarbonate block copolymer articles (e.g., films) of the present invention are resistant to scratching and abrasion, and can be flexed repeatedly without cracking or delamination of the coating.

The siloxane-polycarbonate block copolymers employed in the coated articles of this invention can be represented by the structural formula:

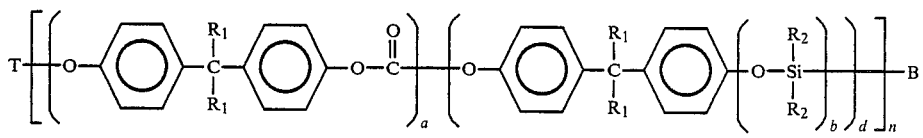

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, d is 1 or more, B is

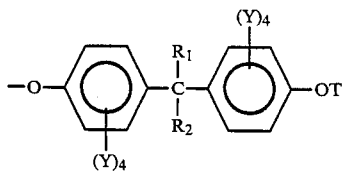

where T is member selected from hydrogen and

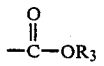

$R_1$ is a member selected from the class of hydrogen, monovalent hydrocarbon radicals and halogenated monovalent hydrocarbon radicals, $R_2$ is a member selected from the class of monovalent hydrocarbon radicals, halogenated monovalent hydrocarbon radicals and cyanoalkyl radicals, $R_3$ is a member selected from the class consisting of monovalent hydrocarbon radicals and halogenated hydrocarbon radicals, and Y is a member selected from the class consisting of hydrogen, lower alkyl radicals and halogen radicals and mixtures thereof.

Included within the radicals represented by $R_1$ are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; $R_1$ can be all the same radical or any two or more of the aforementioned radicals, and $R_1$ is preferably methyl, $R_2$ includes all radicals included by $R_1$ above except hydrogen, where $R_2$ also can be all the same radical or any two or more of the aforementioned $R_1$ radicals except hydrogen, and $R_2$ is preferably methyl. $R_2$ also includes, in addition to all the radicals included by $R_1$ except hydrogen, cyanoalkyl radicals such as cyanoethyl, cyanobutyl, etc., radicals. Radicals that are included within the definition of Y are hydrogen, methyl, ethyl, propyl, chloro, bromo, iodo, etc., and combinations thereof, and Y is preferably hydrogen.

The hydrolytically stable copolymers used in the coated polycarbonates of the present invention can be further described as comprising recurring copolymeric units of a polydiorganosiloxane joined by substituted aryloxy-silicon linkages to a polyester of dihydric phenol and a precursor of carbonic acid, where each of said recurring copolymeric units comprises by average weight from 10% to about 75% of said polydiorganosiloxane, and preferably from about 40 to 70% by weight. Copolymers of the above nature are described in U.S. Pat. No. 3,189,662, incorporated herein by reference, and can be used either alone as such or in conjunction with well known modifiers to provide particular desired characteristics to the blends.

Illustrative of the commercially available block copolymers is General Electric LR-3320. This material has a specific gravity of 1.12, tensile strength of 2500 to 3900 psi, an elongation of 230 to 430, a tear strength (Die C) of 400 lbs/in., and a brittleness temperature below $-76°$ F. and a heat deflection temperature (10 mils under 66 psi Load) of 160° F.

Another such commercially available block copolymer, specifically General Electric LR-5530, has a specific gravity of 1.07, a tensile strength of 2200 to 2500 psi, an elongation of 500-700%, a tear(die C) of 200 lbs/in., a brittleness temperature below $-76°$ F. and a heat deflection temperature (66 psi) of 130° F.

The coated polycarbonate articles of this invention may be in any of a variety of physical configurations. Preferably, the articles are in the form of sheets or films. Such sheets and films may be subsequently formed into various shapes by thermoforming (e.g., vacuum molding).

The compositions used for coating the coated articles of this invention contain a major proportion of an acrylated urethane oligomer and a minor proportion of a difunctional acrylate monomer. The acrylated urethane oligomer may be represented by the general formula:

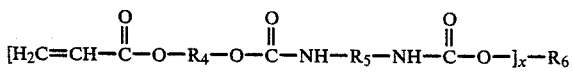

wherein $R_4$ is a lower alkylene group of from 1 to about 4 carbon atoms; $R_5$ is a lower alkylene group of from 1 to about 8 carbon atoms, an arylene group or a dialkylene arylene group of from 6 to about 12 carbon atoms; x is an integer of from 1 to about 4; and $R_6$ is an x-valent residue of a polyhydric alcohol having a molecular weight such that the overall molecular weight of the oligomer ranges from about 800 to about 50,000, preferably from about 2,000 to about 10,000.

$R_5$ is preferably a lower alkylene group having from about 3 to about 6 carbon atoms. Coatings produced from aliphatic urethane oligomers have been found to be less susceptible to the deleterious effects of weathering than similar coatings produced from oligomers which contain aromatic groups. $R_6$ preferably is the residue of an aliphatic polyester or polyether polyol, most preferably a polyester polyol. Such polyester polyols are hydroxy-terminated reaction products of lower alkylene dicarboxylic acids, having from 2 to about 18, preferably from about 4 to about 10 carbon atoms and a lower alkylene diol, having from 2 to about 18, preferably from 4 to about 10 carbon atoms. Branched structures having hydroxy functionalities greater than 2 may be obtained by employing a minor proportion of an alkylene tricarboxylic acid or triol.

The acrylated urethane monomers have a degree of functionality, x, of from 1 to about 4, preferably about 2 or 3. The higher the degree of functionality, the greater will be the crosslink density in the cured coating.

Such acrylated urethane oligomers are well-known, commercially available materials. These materials are described in greater detail by Robert Barklay, Jr., *Radiation Curing*, pp. 4–11, August, 1979 and by Henry C. Miller, *Radiation Curing*, pp. 4–9, May, 1984.

The concentration of the acrylated urethane oligomer in the uncured composition used for preparing the coated polycarbonate articles of this invention range from about 50% by wt. to about 90% by wt., depending upon the particular oligomer used. Preferably, the concentration of the acrylated urethane oligomer ranges from about 60% by wt. to about 80% by wt. of the coating composition.

The coating composition further comprises a minor proportion of a difunctional acrylate monomer. The difunctional acrylate monomer may be represented by the general formula

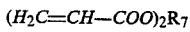

wherein $R_7$ is a divalent radical selected from the group consisting of straight or branched alkylenes containing from 6 to about 30 carbon atoms, provided that, if the alkylene group is branched, at least about 6 carbon atoms are in the chain separating the acrylate groups; and monocyclic, polycyclic and heterocylclic saturated ring systems of from 6 to about 30 carbon atoms.

In preferred difunctional acrylate monomers, $R_7$ is a straight or branched alkylene group containing from 10 to about 20 carbon atoms, or a monocyclic, polycyclic or heterocylclic saturated ring system containing from about 10 to about 20 carbon atoms.

Any of the above-described $R_7$ groups may optionally be substituted with one or more substituents which does not deleteriously affect the properties of the resulting coating. Such substituents include halogen atoms, hydroxyl groups, lower $C_1$-$C_6$ alkoxy groups, amino groups, nitro groups, and the like.

Examples of difunctional acrylate monomers that may be used are hexanediol diacrylate, decanediol diacrylate, octadecanediol diacrylate and the like.

The difunctional acrylate monomer serves several functions in the coating compositions. It is a reactive diluent, thus it may be used for controlling the viscosity of the composition. In addition, it serves as a further crosslinking agent, thus it may be used for increasing the crosslink density of the cured coating. Since the acrylate groups in the difunctional acrylate monomer are separated by a relatively large flexible group, the crosslink density may be increased significantly, without sacrificing the thermoplastic character of the coating.

The actual concentration of the difunctional acrylate monomer will depend upon the nature of the acrylated urethane oligomer and the presence of other reactive species in the composition. When the acrylated urethane oligomer contains a large flexible segment, the concentration of the difunctional acrylate monomer may be reduced. Moreover, when the acrylated urethane oligomer has a low degree of functionality (thus contributing to a low crosslink density), the concentration of the difunctional acrylate monomer may be increased. The presence of other acrylic reactive species in the system may result in a reduction of the amount of the difunctional acrylate monomer employed.

In general, the difunctional acrylate monomer will be employed in the coating composition at a concentration of from about 10% by wt. to about 50% by wt., preferably from about 20% by wt. to about 40% by wt.

In a preferred embodiment, the coating compositions used for preparing the coated polycarbonate articles of this invention will further contain a reactive monofunctional olefinic monomer, such as a monofunctional acrylate or vinyl compound. Such monofunctional acrylate monomers are represented by the general formula

wherein $R_8$ is a lower alkoxycarbonyl group of from 2 to about 10 carbon atoms, lower cycloalkoxycarbonyl of from 4 to about 10 carbon atoms, lower heterocylcooxycarbonyl, of from 4 to about 10 carbon atoms, or nitrile.

Preferred monofunctional acrylic monomers are those wherein $R_8$ is lower alkoxycarbonyl of from 2 to about 6 carbon atoms, lower cycloalkoxycarbonyl of from 4 to about 6 carbon atoms, lower heterocyclooxycarbonyl of from 4 to about 6 carbon atoms, or nitrile. Any of the above-described $R_8$ groups may be optionally substituted, as described above in connection with the $R_7$ groups.

Examples of monofunctional acrylic monomers which may be used include methyl acrylate, ethyl acrylate, butyl acrylate, cyclopropyl acrylate, tetrahydrofurfuryl acrylate, isobornyl acrylate, acrylonitrile and the like.

Monofunctional vinyl compounds that may be used include liquid acrylate-reactive compounds, such as vinyl caprolactam, vinyl pyrrolidone and the like. Such vinyl compounds may advantageously be used in combination with one or more monofunctional acrylate monomers.

The monofunctional olefinic monomer serves as a reactive diluent in the coating composition and reduces the overall crosslink density of the cured coating. Thus, the concentration of the monofunctional olefinic monomer is controlled to provide a hard, abrasion and chemical resistant coating which is also flexible and thermoformable. In general, the concentration of the monofunctional olefinic monomer will range from 0 to about 40% by wt., preferably from about 0 to about 20% by wt. of the uncured coating composition.

When employed, the monofunctional olefinic monomer will replace part of the difunctional acrylate monomer. In those embodiments in which the acrylated urethane oligomer provides high crosslink density, the monofunctional olefinic monomer may entirely replace the difunctional acrylate monomer.

The photocurable coating compositions also contain a photosensitizing amount of a photosensitizer, i.e., an amount effective to effect the photocure of the coating composition. Generally, this amount is from about 0.01% to about 10% by weight, preferably from about 0.1% to about 5% by weight of the photocurable coating composition. These additives and the cure thereof are generally well-known in the art. Some nonlimiting examples of these UV radiation photosensitizers include ketones, such as benzophenone, acetophenone, benzil, benzyl methyl ketone; benzoins and substituted benzoins such as benzoin methyl ether, alpha-hydroxymethyl benzoin isopropyl ether; halogen containing compounds such as alpha-bromoacetophenone, p-bromoacetophenone, alpha-chloromethylnaphthalene; and the like.

The coating compositions used for preparing the coated articles of this invention may also optionally contain various flatting agents, surface active agents, thixotropic agents, UV light absorbers and dyes. All of these additives and the use thereof are well-known in the art and do not require extensive discussions. Therefore, only a limited number will be referred to, it being understood that any compounds possessing the ability to function in such a manner, i.e., as a flatting agent, surface active agent, UV light absorber, and the like, can be used so long as they do not deleteriously affect the photocuring of the coating compositions and do not adversely affect the non-opaque character of the coating.

The various surface-active agents, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are references and incorporated herein.

The coated articles of the present invention have been found to have good resistance to abrasion and scratching, good chemical resistance and excellent flexibility and thermoformability. The invention is further illustrated by the following examples, which are not intended to be limiting.

EXAMPLES 1–10

The compositions identified in Table 1 below were prepared by blending the ingredients in the proportions shown. All of the coatings were coated onto 4 by 8 by ⅛ inch polycarbonate sheets using a wire-wound drawdown bar. the coated panel was then cured in a Linde photocuring apparatus (consisting of a variable speed conveyor running through a chamber containing mercury vapor lamps which emit light mainly at 2537 Angstroms, 3150 Angstroms, and 3605 Angstroms operated in air) wherein the nitrogen pressure is 25 psi, the speed of the conveyor is 50 ft./min. and both lamps are operated at 200 W/LI. Curing was accomplished in one pass.

Post-cured samples were conditioned for 16 hours at 120° C. to dry the polycarbonate substrate for optimum thermoforming. Prepared samples were heated to 190° C. for 30 minutes prior to both thermoforming around a 1½ inch pipe mandrel and vacuum forming into a 3 inch diameter flask funnel. Samples were observed for their ability to thermoform (+or −) and were graded on a scale of 1 to 10 (1-best to 10-worst) for their ability to vacuum mold.

All coated samples that properly cured were tested for abrasion resistance. The abrasion test is one wherein test panels having a ¼ inch diameter hole cut in the center are subjected to a Taber Abraser. The Taber Abraser is equipped with CS-10F wheels which are resurfaced every 200 cycles by abrading for 25 cycles on a S-111 refacing disc. The weights used in combination with the CS-10F wheels are 500 gm. weights. Initial measurements of % Haze are made at four places around the future wear track of the sample using a Gardner Hazemeter. The sample is abraded for 100 cycles, cleaned with isopropanol, and the % Haze is remeasured at the same four places. The four differences in % Haze are calculated and averaged to give the % Haze.

The coated polycarbonate panels were subjected to a Yellowness Index Test as set forth in ASTM D-1925-70 under the conditions shown in Table 1. They were also subjected to a water soak test, in which the samples were soaked in water at 65° C, and the number of days to failure of a scribed adhesion test were recorded. The scribed adhesion test consists of using a multiple blade tool to cut parallel grooves through the coating into the substrate, the sample is then rotated 90° and the cutting process is repeated. This leaves a grid pattern of 1 mm squares cut into the coating. An adhesive tape is applied over the cross-hatched area and quickly pulled off. A sample fails the adhesion test if any of the squares are pulled off. The results of the tests are reported in Table 1.

TABLE 1

| | Example No. | | | | | | | | | |
|---|---|---|---|---|---|---|---|---|---|---|
| | 1 | 2 | 3 | 4 | 5 | 6 | 7 | 8 | 9 | 10 |
| | Parts by Weight | | | | | | | | | |
| Acryl.Ureth.[1] | 56 | 56 | 64 | 56 | 64 | 56 | 56 | 64 | 64 | 64 |
| HDDA[2] | 24 | 24 | 16 | 24 | 16 | 24 | 24 | 16 | 16 | 16 |
| ODA[3] | 18 | — | — | — | — | 8 | — | 8 | — | 18 |

TABLE 1-continued

| | Example No. | | | | | | | | | |
|---|---|---|---|---|---|---|---|---|---|---|
| | 1 | 2 | 3 | 4 | 5 | 6 | 7 | 8 | 9 | 10 |
| V-caprolactam | — | 18 | 18 | — | — | 10 | 10 | 10 | 10 | — |
| THFA[4] | — | — | — | 18 | 18 | — | 8 | — | 8 | — |
| DEAP[5] | 2 | 2 | 2 | 2 | 2 | 2 | 2 | 2 | 2 | 2 |
| | Test Results | | | | | | | | | |
| % Taber Haze 65° | 6.0 | 4.7 | 5.6 | 5.6 | 6.0 | 6.3 | 4.8 | 5.2 | 5.5 | 5.7 |
| Water Soak | 18 | 28 | 24 | 118 | 7 | 11 | 18 | 4 | 7 | 22 |
| YI | 0.6 | 1.5 | 1.7 | 0.5 | 0.5 | 0.6 | 0.7 | 0.6 | 0.8 | 0.6 |
| YI 16 hr. @ 120° C. | 2.3 | 4.7 | 4.2 | 1.6 | 2.0 | 3.0 | 2.3 | 2.4 | 2.7 | 2.3 |
| YI 16 hr. @ 120° + ½ hr. @190° C. | 3.2 | 5.2 | 5.2 | 2.4 | 2.4 | 3.0 | 2.8 | 3.3 | 4.7 | 2.5 |
| Thermoform | + | + | + | + | + | + | + | + | + | + |
| Vacuum form | 4 | 8 | 10 | 3 | 5 | 2 | 7 | 1 | 9 | 6 |

Footnotes to Table 1
[1] An acrylate-terminated aliphatic urethane-polyester oligomer having a molecular weight of 1300 and a degree of functionality of 2. It was obtained from American Biltrite Corp., Cambridge, Massachusetts. This oligomer is available under the trade designation AB-508-64.
[2] Hexanediol Diacrylate
[3] Octadecanediol Diacrylate
[4] Tetrahydrofurfuryl Acrylate
[5] Diethoxyacetophenone The data presented in Table 1 demonstrate that coatings prepared according to the present invention have good abrasion resistance, adhere well to the polycarbonate substrate and are thermoformable. The data further demonstrate that, for the particular acrylated urethane oligomer and difunctional acrylate employed, the higher ratios of difunctional acrylate to oligomer gave superior thermoformability and adhesion results.

EXAMPLE 11

A coating composition was prepared by blending the following ingredients thoroughly:

| Component | Parts by Weight |
|---|---|
| Acryl. Ureth.[1] | 50.4 |
| HDDA[2] | 21.6 |
| V-Caprolactam | 10.0 |
| DEAP[3] | 4.8 |
| L-UVA[4] | 10.0 |
| THFA[5] | 16.2 |

[1] As identified in footnotes to Table 1.
[2] Hexanediol Diacrylate
[3] Diethoxyacetophenone
[4] Latent ultraviolet light absorber
[5] Tetrahydrofurfuryl Acrylate This coating was applied to a 45 mil sheet of siloxane-polycarbonate block copolymer resin (LR-resin obtained from General Electric Company, Pittsfield, Mass.). The application procedure was substantially as described in Examples 1–10, except that the conveyor speed was 25 ft./min. and the initial cure was followed with an additional cure as described above. The Taber Abrasion value for the coated material was 6.0% and the coated film was stretched to 100% elongation without cracking or deforming the coating.

We claim:
1. A polycarbonate article is coated with the photoreaction product of a composition, said composition consisting essentially of:

(a) from 50% by weight to 90% by weight of an acrylated urethane oligomer, which has a molecular weight of from about 800 to about 50,000 and a degree of functionality of from 1 to about 4;
(b) from 10% by weight to about 50% by weight of a difunctional acrylate monomer; and
(c) a photosensitizing amount of a photosensitizer;
wherein relative proportions of the acrylated urethane oligomer and the difunctional acrylate monomer are such as to provide a flexible, thermoformable cured coating.

2. The coated polycarbonate article of claim 1, wherein the acrylated urethane oligomer is a compound of the formula

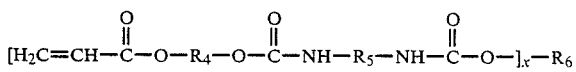

wherein $R_4$ is a lower alkylene group of from 1 to about 4 carbon atoms; $R_5$ is a lower alkylene group of from 1 to about 8 carbon atoms, an arylene group or a dialkylene arylene group of from 6 to about 12 carbon atoms; x is an integer of from 1 to about 4; and $R_6$ is an x-valent residue of a polyhydric alcohol having a molecular weight such that the overall molecular weight of the oligomer ranges from about 800 to about 50,000.

3. The coated polycarbonate article of claim 2, wherein $R_5$ is a lower alkylene group having from about 3 to about 6 carbon atoms; x is 2 or 3; $R_6$ is the residue of an aliphatic polyether or polyester polyol; and the molecular weight of $R_6$ group is such that the overall molecular weight of the oligomer is from about 2,000 to about 10,000.

4. The coated polycarbonate article of claim 3, wherein $R_6$ is the reside of a polyester polyol, wherein such polyester polyol is a hydroxy-terminated reaction product of a lower alkylene dicarboxylic acid, having from 2 to about 18 carbon atoms and a lower alkylene diol, having from 2 to about 18 carbon atoms.

5. The coated polycarbonate article of claim 4, wherein $R_6$ is the reside of a polyester polyol, wherein such polyester polyol is a hydroxy-terminated reaction product of a lower alkylene dicarboxylic acid, having from 4 to about 10 carbon atoms and a lower alkylene diol, having from 4 to about 10 carbon atoms.

6. The coated polycarbonate article of claim 1, wherein the difunctional acrylate monomer is a compound of the formula $$(H_2C\!\!=\!\!CH\!\!-\!\!COO)_2R_7$$

wherein $R_7$ is a divalent radical selected from the group consisting of straight or branched alkylenes containing from 6 to about 30 carbon atoms, provided that, if the alkylene group is branched, at least about 6 carbon atoms are in the chain separating the acrylate groups; and monocyclic, polycyclic and heterocylclic saturated ring systems of from 6 to about 30 carbon atoms.

7. The coated polycarbonate article of claim 6, wherein $R_7$ is a straight or branched alkylene group containing from 10 to about 20 carbon atoms, or a monocyclic, polycyclic or heterocyclic saturated ring system containing from about 10 to about 20 carbon atoms.

8. The coated polycarbonate article of claim 7, wherein $R_7$ is substituted with a halogen atom, hydroxyl group, lower $C_1$-$C_6$ alkoxy group, amino group, or nitro group.

9. The coated polycarbonate article of claim 1, wherein the concentration of the acrylated urethane oligomer in the coating composition used for coating the polycarbonate article is from about 60% by wt. to about 80% by wt., and the concentration of the difunctional acrylate monomer in the coating composition used for coating the polycarbonate article is from about 20% by wt. to about 40% by wt.

10. The coated polycarbonate article of claim 3, wherein the concentration of the acrylated urethane oligomer in the coating composition used for coating the polycarbonate article is from about 60% by wt. to about 80% by wt., and the concentration of the difunctional acrylate monomer in the coating composition used for coating the polycarbonate article is from about 20% by wt. to about 40% by wt.

11. A polycarbonate article is coated with the photoreaction product of a composition, said composition comprising:
(a) from 50% by weight to 90% by weight of an acrylated urethane oligomer, which has a molecular weight of from about 800 to about 50,000 and a degree of functionality of from 1 to about 4;
(b) from 10% by weight to about 50% by weight of a difunctional acrylate monomer;
(c) a monofunctional olefinic monomer, which is selected from the group consisting of vinyl caprolactam, vinyl pyrrolidone and a monofunctional acrylate monomer of the formula $$R_8\!\!-\!\!CH\!\!=\!\!CH_2$$

wherein $R_8$ is a lower alkoxycarbonyl group of from 2 to about 10 carbon atoms, lower cycloalkoxycarbonyl of from 4 to about 10 carbon atoms, lower heterocyclooxycarbonyl, of from 4 to about 10 carbon atoms, or nitrile; and
(d) a photosensitizing amount of a photosensitizer.

12. The coated polycarbonate article of claim 11, wherein $R_8$ is lower alkoxycarbonyl of from 2 to about 6 carbon atoms, lower cycloalkoxycarbonyl of from 4 to about 6 carbon atoms, lower heterocyclooxycarbonyl of from 4 to about 6 carbon atoms, or nitrile.

13. The coated polycarbonate article of claim 12, wherein $R_8$ is substituted with a halogen atom, hydroxyl group, lower $C_1$-$C_6$ alkoxy group, amino group, or nitro group.

14. The coated polycarbonate article of claim 1, wherein the polycarbonate is a siloxane-polycarbonate block copolymer.

15. A polycarbonate article is coated with the photoreaction product of a composition, said composition consisting of:
(a) from 50% by weight to 90% by weight of an acrylated urethane oligomer, which has a molecular weight of from about 800 to about 50,000 and a degree of functionality of from 1 to about 4;
(b) from 10% by weight to about 50% by weight of a difunctional acrylate monomer; and
(c) a photosensitizing amount of a photosensitizer, wherein relative proportions of the acrylated urethane oligomer and the difunctional acrylate monomer are such as to provide a flexible, thermoformable cured coating 16. A polycarbonate article is coated with the photoreaction product of a composition, said composition consisting essentially of:
(a) from 50% by weight to 90% by weight of an acrylated urethane oligomer, which has a molecular weight of from about 800 to about 50,000 and a degree of functionality of from 1 to about 4;
(b) from 10% by weight to about 50% by weight of a difunctional acrylate monomer;
(c) a monofunctional olefinic monomer, which is selected from the group consisting of vinyl caprolactam, vinyl pyrrolidone and a monofunctional acrylate monomer of the formula $$R_8\!\!-\!\!CH\!\!=\!\!CH_2$$

wherein $R_8$ is a lower alkoxycarbonyl group of from 2 to about 10 carbon atoms, lower cycloalkoxycarbonyl of from 4 to about 10 carbon atoms, lower heterocyclooxycarbonyl, of from 4 to about 10 carbon atoms, or nitrile; and
(d) a photosensitizing amount of a photosensitizer.

* * * * *